United States Patent [19]
Yatomi et al.

[11] Patent Number: 4,883,933
[45] Date of Patent: Nov. 28, 1989

[54] TRAVELING WIRE ELECTROEROSION MACHINE

[75] Inventors: Takeshi Yatomi; Makoto Tanaka, both of Nagoya, Japan

[73] Assignee: Mitsubishi Denki Kabushiki Kaisha, Tokyo, Japan

[21] Appl. No.: 65,246

[22] Filed: Jun. 18, 1987

[30] Foreign Application Priority Data

Jun. 18, 1986 [JP] Japan ............................... 61-140309
Jun. 18, 1986 [JP] Japan ............................... 61-140310

[51] Int. Cl.$^4$ .............................................. B23H 7/10
[52] U.S. Cl. .................................. 219/69.12; 204/206
[58] Field of Search .................... 219/69 W; 204/206

[56] References Cited

U.S. PATENT DOCUMENTS

| | | | |
|---|---|---|---|
| 4,123,645 | 10/1978 | Shichida et al. | 219/69 W |
| 4,379,042 | 4/1983 | Inoue | 219/69 W |
| 4,495,393 | 1/1985 | Janicke | 219/69 M |
| 4,605,834 | 8/1986 | Inoue | 219/69 W |
| 4,613,740 | 9/1986 | Ichikawa | 219/69 W |
| 4,638,140 | 1/1987 | Obara et al. | 219/69 D |
| 4,736,086 | 4/1988 | Obara | 219/69 W |

FOREIGN PATENT DOCUMENTS

| | | |
|---|---|---|
| 148954 | 1/1985 | European Pat. Off. . |
| 1615508 | 3/1972 | Fed. Rep. of Germany . |
| 150934 | 11/1980 | Japan . |
| 150936 | 11/1980 | Japan . |
| 58-28424 | 2/1983 | Japan ............................... 219/69 W |
| 192721 | 11/1983 | Japan ............................... 219/69 W |

*Primary Examiner*—A. D. Pellinen
*Assistant Examiner*—Geoffrey S. Evans
*Attorney, Agent, or Firm*—Sughrue, Mion, Zinn, Macpeak & Seas

[57] ABSTRACT

A travelling wire electro-erosion machine in which an electrical discharge is generated in a narrow gap between a wire electrode and a work piece through a processing liquid so as to erossively remove material from the work piece. A wire guide device is provided for supporting and guiding the wire electrode wherein the wire guide device comprises a V-shaped guide member including coplanar intersecting guide surfaces, each of which have a single, continuous, convex arcuate wire engaging surface so as to prevent the wire from experiencing excessive stress.

2 Claims, 5 Drawing Sheets

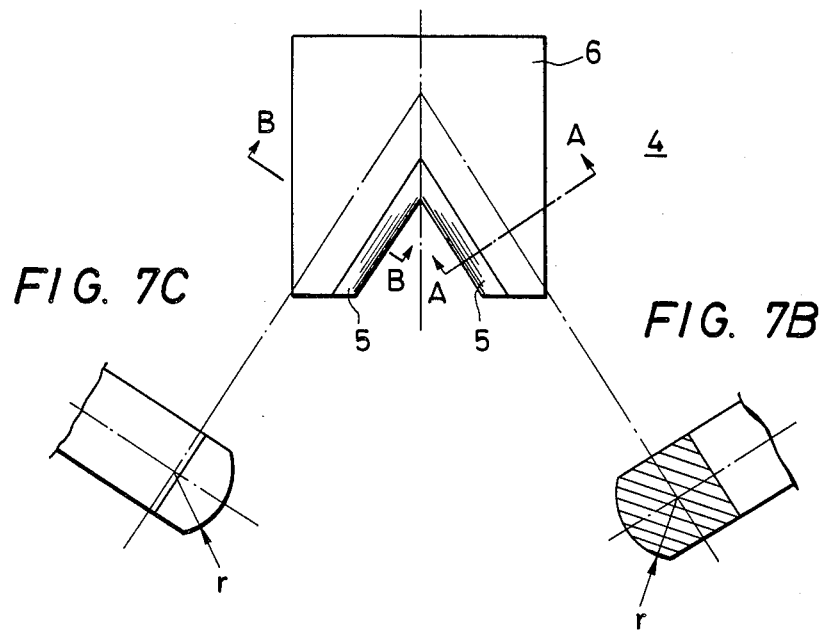
FIG. 7A
FIG. 7C
FIG. 7B
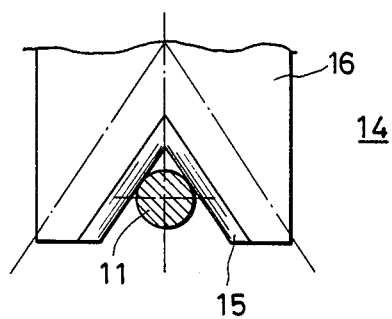
FIG. 7D

TRAVELING WIRE ELECTROEROSION MACHINE

BACKGROUND OF THE INVENTION

1. Field of the Invention

The present invention generally relates to a wire electric spark machine in which discharge is generated in a fine gap between a wire electrode and a work with a processing liquid as a medium so as to progress the working on the work, and particularly relates to an improvement of a wire guiding device in the wire electric spark machine of the type mentioned above. 2. Description of the Prior Art FIG. 1A is a diagram for explaining a wire guiding device in a wire electric spark machine, and in the drawing, the reference numeral 1 designates a wire electrode, 2a and 2b designate die-shaped wire guides for supporting and guiding the wire electrode 1, and 3a and 3b designate power supply members for transmitting electric power from a working power source (not shown) to the wire electrode 1. A clearance between the wire electrode 1 and each of the wire guides 2a and 2b is generally set to about 2–10μm. As shown in FIG. 1A, the power supply members 3a and 3b are generally pressed by the wire electrode 1 at portions above and below the wire guides 2a and 2b respectively, so that the wire electrode 1 is bent by an angle $\alpha$ at each of the wire guides 2a and 2b.

The respective states shown in Figs. 1A and 1B are generally called a straight working state and a taper working state respectively. The operation in the taper working will be described hereunder. It is possible to slant the wire electrode 1 by moving the wire guide 2a horizontally as shown in FIG. 1B. The taper angle $\theta$ of the wire electrode 1 is caused owing to a relative movement between the wire guides 2a and 2b and is variable corresponding to the amount of the movement. In this case, the positional relationship between the power supply member 3a and the wire guide 2a and that between the power supply member 3b and the wire guide 2b are not changed.

The wire guides 2a and 2b are generally made of jewelry such as a diamond, die-shaped, and made very small in size (a radius of curvature is also small). Further, the wire electrode 1 is large in its flexural rigidity, so that when the wire electrode 1 is actually slant by an angle $\theta$ as shown in FIG. 4B, bending deformation is caused in the wire electrode 1, resulting in an error $\epsilon$.

FIG. 3 is an enlarged diagram showing a wire guide 3, and the reference numeral 3a designates a diamond, and a straight portion of about 0.2–0.3 mm acting as a guide portion is formed at the central portion of the wire guide, and the taper angle is made gradually enlarged from the straight portion so that the wire may be inserted easily (Japanese Patent Unexamined Publication (Kokai) 150934/1980).

OBJECTION AND SUMMARY OF THE INVENTION

In such a conventional electric spark machine as described above, a bending deformation error $\epsilon$ is caused in the wire electrode 1, and when the taper angle $\theta$ becomes large, the bending deformation error increases rapidly. If the bending deformation is large, a larger force is applied to the interface between the wire guide 1 and each of wire guides 2a and 2b, resulting in increase in a tensile force applied to the wire electrode 1. As a result, there are such problems that disconnection of the wire is frequently caused in working a work, so that it is inevitable that the working energy is made low at the sacrifice of a working speed, and that working cannot be carried out on a work in the taper angle of about 30 degrees and disconnection of the wire may be caused only owing the running of the wire electrode.

The present invention is intended to solve the foregoing problems, and an object thereof is to provide an electric spark machine having a wire guide device in which the bending deformation of the wire electrode caused by the wire guide is prevented from occurring and the increase of tensile power applied to the wire electrode is eliminated so that the working speed can be improved.

In the electric spark machine according to the present invention, the wire guide device is arranged such that the bending of the wire electrode is squeezed by a wire guide having a large radius of curvature so as not to give a large tensile force to the wire electrode in taper working to thereby increase the working speed.

BRIEF DESCRIPTION OF THE DRAWINGS

FIGS. 4A and 4B shows diagrams illustrating a first embodiment according to the present invention, in which FIG. 4A, is a plane view and FIG. 4B is a cross section taken on line A—A in FIG. 4A;

FIGS. 7A, 7B, 7C and 7D show diagrams illustrating a second embodiment according to the present invention, in which FIG. 7A is a plane view, FIG. 7B is a cross section taken on line B—B in FIG. 7A, FIG. 7C is a cross section taken on line C—C in FIG. 7A, and FIG. 7D is an explanatory diagram showing a positional relationship between a wire electrode and a wire guide device.

DETAILED DESCRIPTION OF THE PREFERRED EMBODIMENTS

Figure 4A:
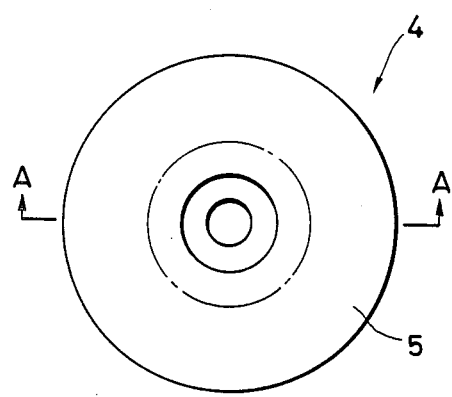
Figure 4B:
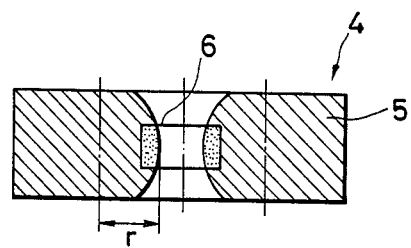

FIGS. 4A and 4B show diagrams illustrating a first embodiment according to the present invention, in which FIG. 4A is a plane view and FIG. 4B is a cross section taken in line A—A in FIG. 4A. In these drawings, reference numeral 4 designates a whole wire guide device, 5 designates a body of the wire guide device, and designates a supporting portion which a wire electrode directly touches. The supporting portion 6 touches the wire electrode when the wire electrode 1 is made vertical, and the wire electrode 1 touches both of the body 5 and the supporting portion 6 when the wire electrode 1 is slanted with respect to the vertical direction, for example, in taper working.

In FIG. 4B, a touching surface of the wire electrode 1 in taper working is arcuate with a radius of curvature of r. If the value of r is set to r ≧ 5 (mm), there is a large difference in effect compared with a conventional die guide (generally, r' ≈ 0.1-0.5mm).

In this embodiment, the body 5 and the supporting portion 6 are made of a sapphire and a diamond. A clearance between the wire electrode 1 and the supporting portion 6 is set to 2 μm.

Figure 1A:
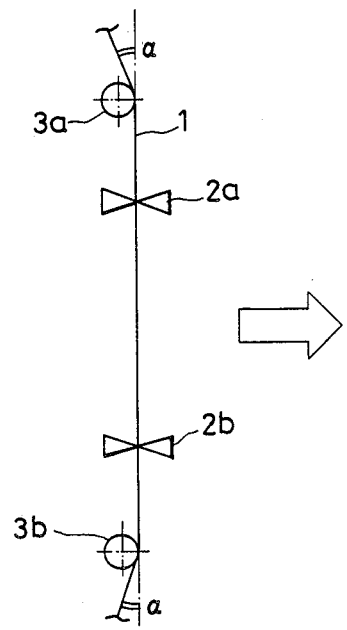
FIG. 1 shows diagrams for explaining the operation of a conventional electric spark machine.
Figure 1B:
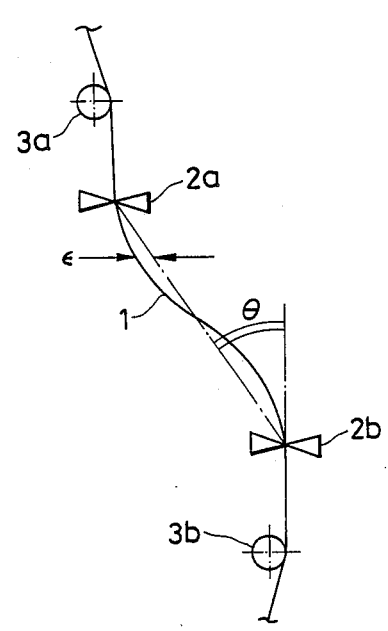
Figure 2:
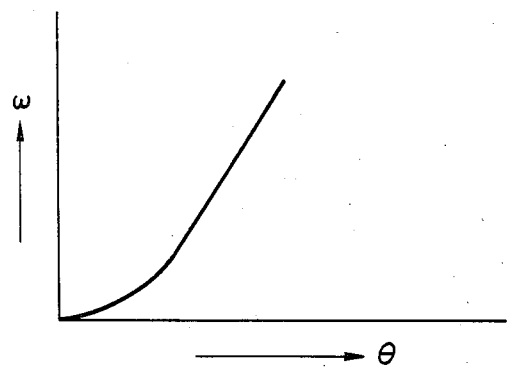
FIG. 2 is a graph showing a relationship between a taper angle $\theta$ and a bending deformation error $\epsilon$ in the conventional electric spark machine.
Figure 3:
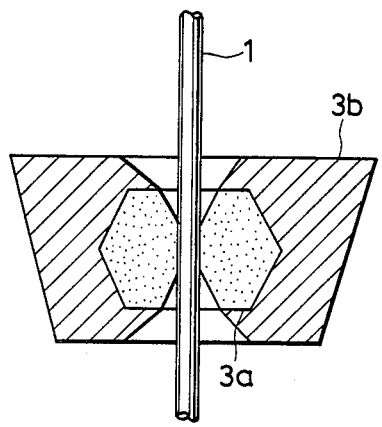
FIG. 3 is an enlarged cross section showing a conventional electric guide.
Figure 5A:
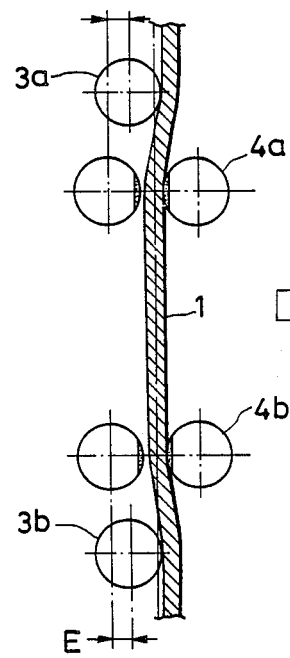
FIG. 5 diagrams for explaining the operation of the embodiment according to the present invention.
Figure 5B:
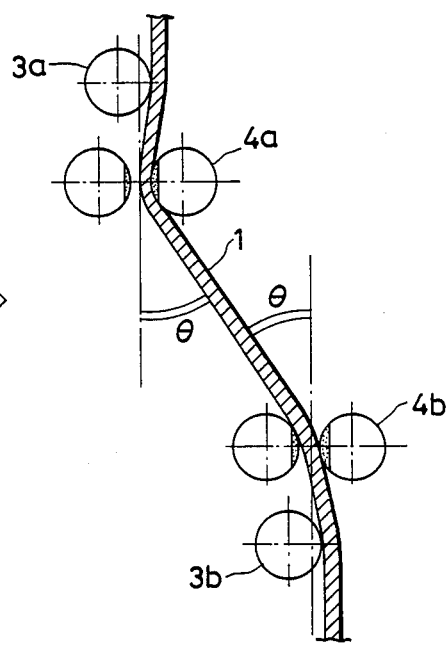

In the thus arranged electric spark machine, the wire electrode 1 is supported directly by wire guides 4a and 4b and is squeezed by power supply members 3a and 3b by a squeezing value E, as shown in FIG. 5A. In this case, the respective radii of curvature at touching portions between the wire electrode 1 and each of the wire guides 4a and 4b and between the wire electrode 1 and each of the power supply members 3a and 3b are set to r equal to each other as shown in FIG. 4B. In this case, if the wire electrode 1 is slanted as shown in FIG. 5B, the wire electrode 1 is bent along the radius of curvature r of each of the wire guides 4a and 4b so that taper working with angle $\theta$ can be realized. In this case, it is a matter of course that the error as shown in FIG. 1B is not caused.

Figure 6:
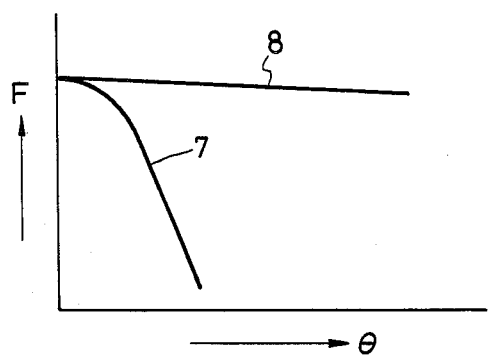
FIG. 6 is a graph showing a relationship between a taper angle $\theta$ and a working speed F.

FIG. 6 is a graph showing a relationship between a taper angle $\theta$ and a working speed F, in which a line 7 shows the relationship in the conventional electric spark machine and a line 8 shows that in this embodiment. In the conventional machine, disconnection of a wire electrode occurs frequently owing to the increase in tensile force, curling, and distortion due to bending of the wire electrode corresponding to the increasing of the taper angle $\theta$, resulting in rapid decrease of the working speed F as seen from the line 7 in the graph. On the contrary, in the case according to the present invention, the working speed F varies little relative to the speed F at the taper angle $\theta = 0$ even when the taper angle $\theta$ is increased, so that it is possible to perform high-speed working in a region where the taper angle $\theta$ is large as seen from the line 8 in the graph.

Although the first embodiment shows the case where a sapphire and a diamond are respectively used for the body 5 and the supporting portion 6, the invention is not limited to this, but any material may be used so long as the material has a large wear proof.

As the result of experiments made by the inventor of this invention, it has been found that if the supporting portion 6 and the body 5 are made of the same material, the production is easy and inexpensive. In this case, as the material, jewelry such as a sapphire or a ruby, or ceramics such as silicon nitride is suitable, and it is preferable that the material is an insulating one.

It has been further found that although the clearance between the wire electrode and the supporting portion 6 was selected to be 2 μm in foregoing embodiment, the same effect of the present invention can be obtained in the case where the clearance is selected to be a range from zero inclusive to 20 μm inclusive.

According to the present invention, as described above, the wire guide device is arranged so as to be arcuate (doughnut-like) in all the direction in a horizontal plane, so that there is such a meritorious effect that the increase of tensile force, curling, and distortion due to the bending force caused by the slant of the wire electrode can be prevented from occurring in the wire electrode to thereby prevent disconnection of the wire electrode from occurring even if the working speed is increased.

FIGS. 7A, 7B, 7C and 7D show diagrams illustrating a second embodiment according to the present invention, in which FIG. 7A is a plane view, FIG. 7B is a cross section taken on line B—B in FIG. 7A, FIG. 7C is a cross section taken on line C—C in FIG. 7A, and FIG. 7D is explanatory diagram showing a positional relationship between a wire electrode 11 and a wire guide device 14. In these drawings, the reference numeral 14 designates the whole wire guide device, 15 designates the circular cylindrical surface, and 16 designates a body including the circular cylindrical surface. The circular cylindrical surface 15 is arcuate with a radius of curvature r as shown in FIG. 7B. As apparent from FIG. 7D, the wire electrode 11 is easy in initial setting compared with the conventional die guide (the clearance between the wire electrode and the guide being set to 5-10μm), and the clearance is 0. In taper working with the wire electrode 11 made slanted, the wire electrode 11 is bent along the arcuate shape when it is slanted at right angles to the circular cylindrical surface 15, while bent along an ellipse when it is bent in the other directions.

Further, being selected to be r ≧ 5 (mm), the radius of curvature r of the circular cylindrical surface 15 is much larger than that of the conventional die guide (generally, r' ≈ 0.1-0.5mm), so as to reduce the influence of the bending force. The material of the circular cylindrical surface 15 is a sapphire.

Figure 8A:
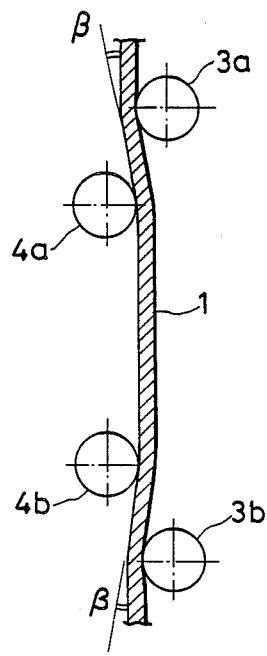
FIGS. 8A and 8B show diagrams for explaining the operation of the second embodiment according to the present invention.
Figure 8B:
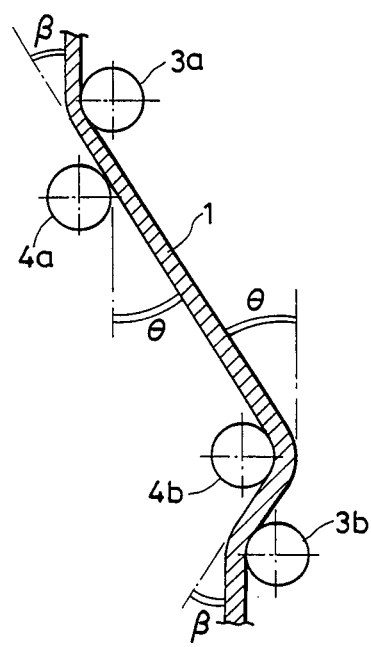

In the electric spark machine arranged as described above, the wire electrode 11 is supported straight by wire guides 14a and 14b and squeezed by power supply members 13a and 13b with a squeezing angle as shown in FIG. 8A. In this case, the respective radii of curvature at the touching portions between the wire electrode 11 and each of the wire guides 14a and 14b and between the wire electrode and each of the power supply members 13a and 13b are r equally to each other as shown in FIGS. 7B and 7C. In this case, even when the wire electrode 11 is slanted (in taper working) as shown in FIG. 8B, the wire electrode 11 is bent along the radius of curvature r of the wire guides 14a and 14b so that the taper working can be performed at angle $\theta$. It is needless to say that such an error z as shown in FIG. 1B is not caused. In FIG. 8B, when the angle is $\theta$, the squeezing angel must be always $\beta \geq \theta$.

Figure 9:
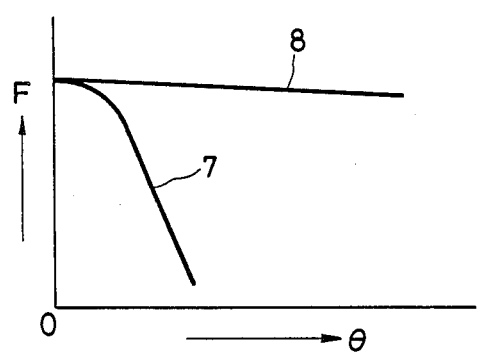
FIG. 9 is a graph showing a relationship between a taper angle $\theta$ and a working speed F.

FIG. 9 is a graph showing a relationship between a taper angle $\theta$ and a working speed F, in which a line 17 shows the relationship in the conventional electric spark machine and a line 18 shows that in this embodiment. In the conventional machine, disconnection of a wire electrode occurs frequently owing to the increase in tensile force, curling, and distortion due to bending of the wire electrode corresponding to the increasing of the taper angle $\theta$, resulting in rapid decrease of the working speed F as seen from the line 17 in the graph. On the contrary, in the case according to the present invention, the working speed F varies little relative to the speed F at the taper angle $\theta = 0$ even when the taper angle $\theta$ is increased, so that it is possible to perform high-speed working in a region where the taper angle $\theta$ is large as seen from the line 18 in the graph.

Although the second embodiment shows the case where a sapphire is used for the circular cylindrical surface 15, the invention is not limited to this, but any material may be used so long as it has a large wear proof.

As the result of experiments made by the inventor of this invention, it has been found that if the circular cylindrical surface 15 and the body 16 are made of the same material, the production is easy and inexpensive. In this case, as the material, jewelry such as a sapphire, a ruby or the like, or ceramics such as silicon nitride is suitable, and it is preferable that the material is an insulating one.

In the above-mentioned embodiment, the squeezing angle in FIG. 8B is selected to be $\beta \geqq \theta$, preferably to be $\beta$30 degrees according to the experiments.

According to the present invention, as described above, the wire guide device is formed to be a circular cylindrical surface arranged in a V-shape, so that there is such a meritorious effect that the increase of tensile force, curling, and distortion due to the bending force caused by the slant of the wire electrode can be prevented from occurring in the wire electrode to thereby prevent disconnection of the wire electrode from occurring even if the working speed is increased. There is a further meritorious effect that the setting of the wire electrode can be made easily.

What is claimed is:

1. In a travelling wire electroerosion machine in which an electrical discharge is generated in a narrow gap between a wire electrode and a workpiece through a processing liquid so as to erosively remove material from said workpiece, the improvement comprising a wire guide device for supporting and guiding said wire electrode wherein said wire guide device comprises a V-shaped guide member including coplanar intersecting guide surfaces, each of said guide surfaces having a single, continuous, convex, arcuate wire engaging surface.

2. The travelling wire electroerosion machine according to claim 1, in which respective V-shaped guide members provided at upper and lower portions of said wire guide device for supporting and guiding said wire electrode are oriented in the same direction.

* * * * *